INVENTORS
WILLIAM A. SCHEUBLEIN JR.
LOUIS P. FISTER

ATTORNEYS

INVENTORS
WILLIAM A. SCHEUBLEIN JR.
LOUIS P. FISTER

*Gravely, Lieder & Woodruff*

ATTORNEYS

INVENTORS
WILLIAM A. SCHEUBLEIN JR.
LOUIS P. FISTER

Gravely, Lieder & Woodruff

ATTORNEYS

INVENTORS
WILLIAM A. SCHEUBLEIN JR.
LOUIS P. FISTER

*Gravely, Lieder & Woodruff*

ATTORNEYS

United States Patent Office 3,429,598
Patented Feb. 25, 1969

3,429,598
BALL JOINT UNIT FOR STEERABLE
VEHICLE WHEELS
William A. Scheublein, Jr., Ballwin, and Louis P. Fister,
St. Louis, Mo., assignors to Moog Industries, Inc., St.
Louis, Mo., a corporation of Missouri
Filed Oct. 15, 1965, Ser. No. 496,538
U.S. Cl. 287—87  6 Claims
Int. Cl. F16c 11/06

ABSTRACT OF THE DISCLOSURE

A ball joint unit in which the housing encloses a stud having an enlarged end composed of a head portion on the stud formed with an outwardly convergently directed conical portion surrounded by an annular surface located substantially in the great circle plane, and a plurality of bearing elements having first surfaces which are segments of a sphere and second surfaces which are segments of a cone, with the spherical segments substantially conforming to and bearing upon the interior bearing surface of the housing and the second surfaces engaged on the conical projection which is part of the stud so that the load carrying surfaces within the ball joint assembly, at least in the initial wear-in stages, will be substantially located at or closely adjacent the great circle plane of the assembly.

---

This invention is directed to improvements in ball joints for vehicles and particularly for steerable front wheels.

In present day vehicles using ball joints for mounting the steerable wheels each wheel is provided with a pair of ball joints which establish the axis of turning and permit vertical rise and fall of the wheel. One of the ball joints for each wheel is a prime load carrying unit and the other one is a follower unit. The present invention is directed to improvements in the prime load carrying ball joint units which may be either tension or compression loaded depending on the design geometry of the wheel mounting system.

The major forces acting on the steerable wheels of a vehicle are gravity, dynamic loading, centrifugal loading and braking and acceleration force. These forces produce a resultant force upon a ball joint and the resultant force has horizontal and vertical components which are present at all times. The magnitudes of the horizontal and vertical components vary or change instantaneously and independently of each other, therefore the magnitude and direction of the resultant force or load varies from instant to instant. It is understood that a tension loaded ball joint unit has a vertical component which always acts downwardly and in a compression loaded ball joint unit the vertical component always acts upwardly. Since this vertical component of the resultant force is always present it only varies its magnitude and never reverses its direction. Therefore it can be stated that in a tension loaded ball joint unit the resultant force will always act below the horizontal plane of the center of rotation, and in a compression loaded ball joint unit the resultant force will always act above the horizontal plane of the center of rotation.

The ideal ball joint unit would have the spherical stud head perfectly complementary to the spherical bearing surface in the housing. However in actual practice manufacturing tolerances prevent the attainment of perfect complementary spherical surfaces as each part has its own tolerance which results in the presence of axial and radial clearance. The existence of clearance permits the stud head to climb the housing bearing surface which results in a pounding action. In the past ball joint constructions have limited vertical clearance in an attempt to overcome this critical pounding problem. Such limiting means has been in the form of axial pre-loading means which complements the main loading whether it be compression or tension. The preloading means helps by damping the impact but it does not prevent climbing.

In the present ball joint unit the critical aim is to control radial clearance and keep the contact surface between the spherical stud head and spherical bearing surface in the housing substantially on the horizontal plane of the center of rotation. By accomplishing this aim the resultant force in the ball joint unit will always act above the contact surface in a compression loaded ball joint unit in the direction of the vertical component of the resultant force, and in a tension loaded ball joint unit the resultant force will always act below the contact surface in the direction of the vertical component of the resultant force. Therefore, by controlling radial clearance in these ball joint units the spherical stud head cannot climb, and pounding is eliminated.

In view of the foregoing, the present ball joint units include spherical bearings composed of two or more segments with a combined diameter identical or substantially complementary to the mating spherical bearing surface in the housing. The bearing segments have an internal tapered bore which substantially complements a tapered portion on the stud head. The segments and the stud head portion are manufactured so that the tolerance variations thereof will insure the contact therebetween always at or close to the greatest diameter. The wedging action of the tapered stud head portion then forces the segmental bearings against the spherical housing bearing at a plane that is very close to the horizontal plane of the center of rotation. In a new ball joint unit the plane of contact will be approximately 3 to 5 degrees above or below the horizontal plane of rotation for compression or tension loaded ball joints respectively. This theory of operation will hereinafter be more fully described in connection with certain preferred forms of ball joint units.

It is an important object of this invention to provide a ball joint unit with components that have a mating configuration to result in contact being substantially at the point of greatest diameter.

It is also an object of this invention to provide an improved ball joint unit that insures that the resultant force always acts beyond the contact surfaces in the direction of the vertical or axial force component so that the stud head is controlled and cannot climb and produce pounding.

Another object of the invention is to provide a ball joint unit of truly self-centering action in operation by substantially preventing lateral shift of the vertical axis of the stud.

Yet another object of the invention is to provide a ball joint unit having unique components to maintain constant contact between the spherical stud head assembly and the housing bearing surface substantially on the horizontal plane of the center of rotation.

These and other objects and advantages of the present invention will be more fully set forth in connection with certain preferred forms of the ball joint units, reference being had to the accompanying drawings, wherein.

Figure 1:
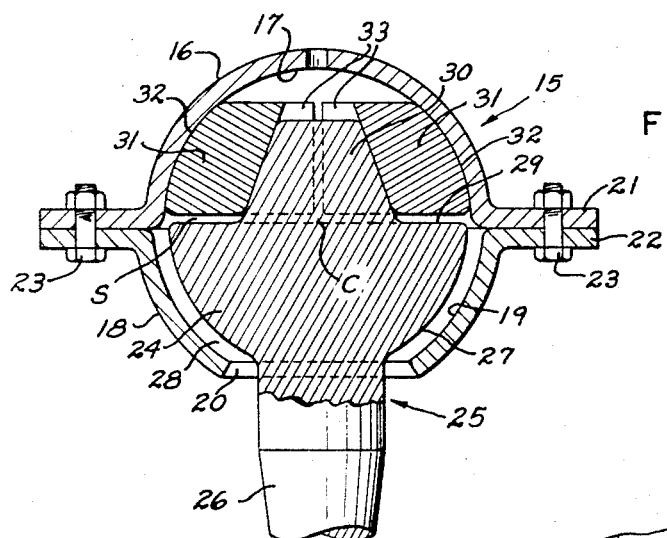
FIG. 1 is a vertical sectional elevational view of a compression loaded ball joint unit incorporating components exhibiting the principles of the present invention.
Figure 2:
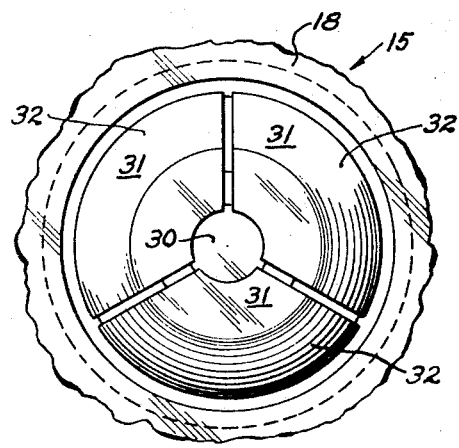
FIG. 2 is a fragmentary plan view of the ball joint unit of FIG. 1 with the housing partly removed.

Referring to FIGS. 1 and 2 the compression loaded ball joint unit 15 includes a suitable housing composed of the upper housing part 16 having an internal bearnig surface 17 which is a converging segment of a sphere extending from its great diameter, a lower housing part 18 having an annular segmental spherical internal surface 19, and an aperture 20. The upper and lower housing parts 16 and 18 are secured in assembly at the mating flanges 21 and 22 respectively by suitable fastening elements 23. The housing parts 16 and 18 enclose the head 24 of a stud 25 with the stud shank 26 projecting through aperture 20 so that the shank may swing angularly about the center C. As shown the housing surface 17 has a great diameter substantially at the meeting plane of the housing parts 16 and 18. The stud head 24 has a semi-spherical portion 27 that fits within the lower housing 18 with a clearance space 28. The semi-spherical portion 27 of the stud head 24 is formed with a flat clutch face 29 and there is a cone-shaped projection 30 extending convergently outwardly from the clutch face in the same direction of convergence of the semi-spherical surface 17. The projecting cone-shaped portion 30 supports a plurality (3 being shown) of segmental bearing elements or wdeges 31. Each wedge 31 is slightly less than one-third of a complete circular part and is formed with a spherical outer bearing face 32 and an inner tapered bearing surface 33.

In constructing the assembly of parts shown in FIGS. 1 and 2 the combined outer surfaces 32 of the segmental wedges 31 constitute a semi-spherical surface that is substantially complementary to the semi-spherical surface 17 in the housing 16. The combined inner tapered surfaces 33 of these wedge elements 31 substantially match the tapered or conical surface of the stud head projection 30. The size and dimensional criteria for the stud head 24, the projection 30 thereon, and the several wedge elements 31 is such that the upward vertical load on the stud 25 which acts through the center C forces the wedge elements 31 to have the zone of greatest diameter in contact with the bearing surface 17 in the housing in parallel with the horizontal plane of the center of rotation. The tolerance of the wedges 31 is such that initially there is a clearance space S above the flat clutch surface 29 on the stud head 24. This space insures that the segments 31 will bear on the tapered surface of the projection 30, thereby causing the segments 31 to be wedged radially outwardly into bearing engagement on the housing surface 17. The center of rotation C and the flat clutch face 29 define the horizontal plane of rotation of the stud head and wedge element assembly.

As the ball joint unit 15 of FIG. 1 wears the rotation of the stud 25 will be held to the vertical axial center line passing through center C. Since the outer surfaces 32 on the wedge elements 31 are larger than the inner cone surfaces 33 the stud rotation will cause movement of the cone projection 30 within the wedge elements 31. This action of stud rotation relative to the elements 31 will continue until the clearance space S reduces to zero and at such time the area of the clutch face 29 will then, when added to the area of contact of the projecting cone surface 30, cause the segments to rotate with the stud 25 and relative to the housing surface 17. This wear-in action of the ball joint components will maintain the desired contact with the housing surface 17 substantially on the horizontal plane of rotation defined by the clutch face 29.

In the ball joint assembly 15 it is assured that there are substantially identical mating surfaces between the elements 31 and the housing surface 17 at or substantially at the horizontal plane of the center of rotation. Further wear-in of these components can only increase the area of contact which will maintain and improve the useful life of the unit because as the wear progresses the horizontal plane of the center of rotation changes proportionately too, which means that it maintains prevailing contact surface in the horizontal plane of the center of rotation. In a ball joint unit of this character when the direction of the resultant force changes or varies it will not be accompanied by the bearing elements 31 climbing on the housing surface 17 because the resultant force will always act above the contact surface between the elements 31 on the stud head 24 and the housing surface 17.

Figure 12:
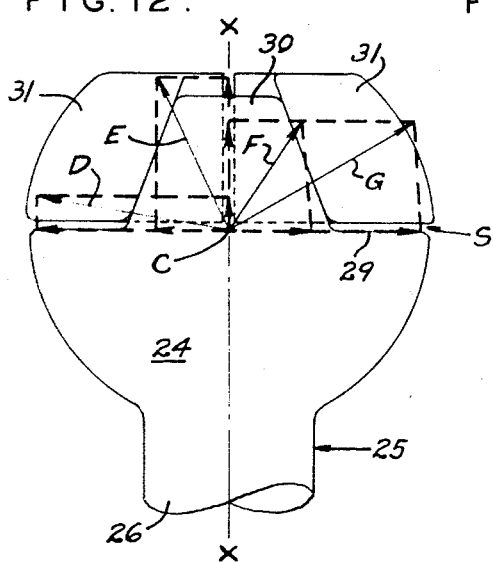
FIG. 12 is a schematic view of the forces acting on the compression loaded ball joint unit of FIG. 1.

Turning to FIG. 12 there is shown schematically the stud 25 and the segmental elements 31 in assembled relation on the projecting cone-shaped portion 31 with the initial clearance space S between the clutch face 29 on the stud head 24 and the larger diameter end faces of the elements 31. The vertical central axis $x$—$x$ of stud 25 passes through the center C and the stud head 24 and projection 31 are symmetrical about such axis $x$—$x$. It is appreciated that the stud 25 rotates about the axis X—X and can pivot or swing laterally about the center C. The force vectors D, E, F and G represent the directions of applied force on the stud at certain times in its operaton under dynamic loading. Since the projection 30 wedges the elements 31 radially outwardly and receives the reaction therefrom through the center C due to the symmetry of the parts about axis X—X, the force vectors D, E, F and G are shown to be made up of components along the axis X—X and components along the plane of rotation which is the plane of the clutch face 29. Thus the diagram shows that the resultant force always acts above the plane of the stud clutch surface 29 for a compression loaded ball joint. Therefore a zone of contact between the bearing surfaces 32 of the elements 31 and the housing bearing surface 17 at or slightly above (say 3 to 5 degrees above) the horizontal plane of the clutch face is established and vertical movement within the assembly is effectively prevented so that no impact occurs between the critical bearing surfaces. Furthermore, the symmetrical form of the elements 31 and projection 30 maintains the stud 25 positioned with its axis X—X through the center of rotation C. It is, of course, understood that the housing parts 16 and 18 are fixed and that the upper bearing surface 17 is formed with its center at C.

A prime load carrying ball joint unit such as shown in

FIG. 1 would need no preload means as the resultant force will always act above the contact surface 32 of bearing segment 31 and surface 17 of housing 15 when the weight of the vehicle is on the wheels or in motion. However, due to the present methods of checking ball joints for wear while the vehicle is jacked up and the weight is relieved to also relieve the forces, it is obvious that manipulation of the unit 15 will show vertical movement of the stud head 24 to the extent allowed by the clearance space 28. This is expected by the experts, but the average operator does not know or is not aware of this fact. Therefore, some means is incorporated in the space 28 to exert a preload on the stud head 24 sufficient to snugly hold the stud head against the bearing surface 17.

Figure 3:
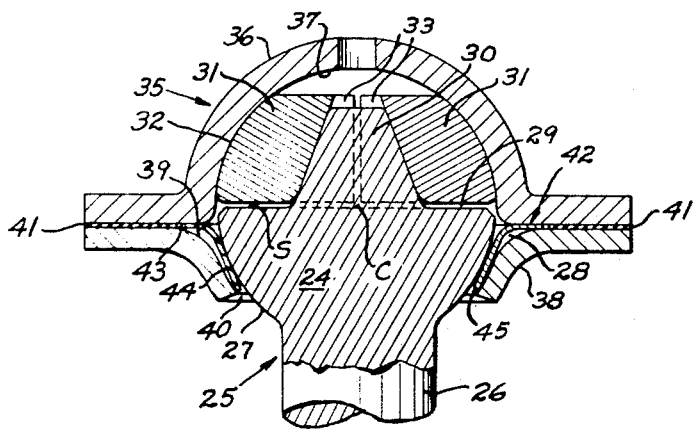
FIG. 3 is a vertical sectional elevational view of a compression loaded ball joint modified from FIG. 1 by having a pre-loading element therein.
Figure 4:
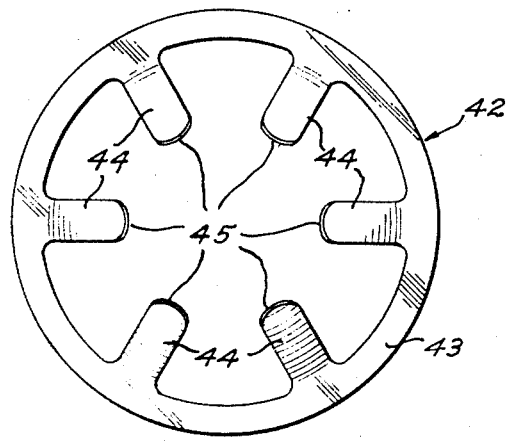
FIG. 4 is a plan view of the pre-loading element applied to the ball joint unit of FIG. 3.

In FIGS. 3 and 4, the ball joint 35 includes the upper housing portion 36 having a spherical inner bearing surface 37, a lower housing portion 38 having an inner surface 39 and a central aperture 40. The joint 35 also includes a stud 25 which is similar to that heretofore described in FIG. 1 and similar reference numerals will be used where possible. The housing portions 36 and 38 are held by suitable means not necessary to show, and the mating faces of the flanges are separated by a gasket 41 which seals lubricant in. Inwardly of the gasket 41 the unit has a preload member 42 (FIG. 4) consisting of a flat ring 43 having radially inwardly projecting fingers 44. The member is resilient so that while the ring 43 is held between the flanges of the housing portions, the fingers 44 project into the space 28 and are forced down by the surface 27 on the stud head. The fingers 44 are sufficiently long so that the inner ends 45 rest on the housing surface 39 just inwardly of aperture 40. Since the fingers tend to want to straighten out they are thus forced to curve inwardly against surface 27 and exert a load on the stud head 24 lifting it into the upper housing bearing surface 37 and always opposing the looseness of the head 24 in the housing portion 38, when the external load is removed during ball joint inspection.

Figure 5:
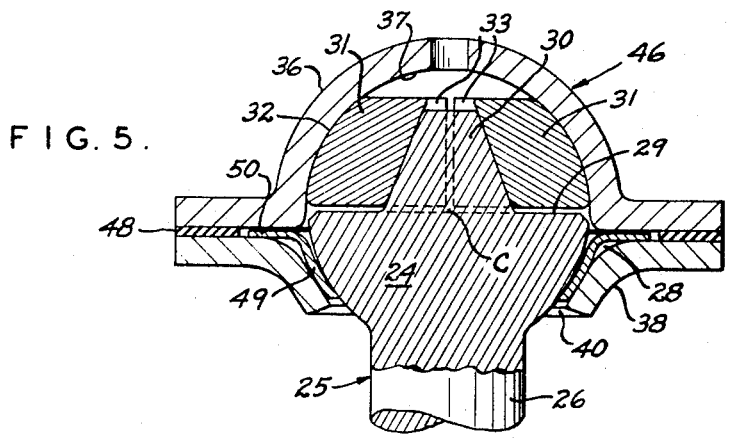
FIG. 5 is a vertical sectional elevational view of a modified compression loaded ball joint unit, but illustrating the principle of this invention.
Figure 6:
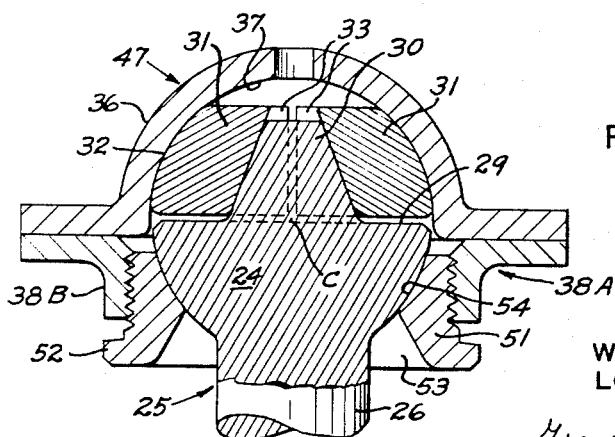
FIG. 6 is a vertical sectional elevational view of a further modification of a compression loaded ball joint unit.

The ball joint unit 46 of FIG. 5 and the unit 47 in FIG. 6 are similar to the unit of FIGS. 1 and 3, but differ in respect of the preload means. In FIG. 5, the flanges of the housing portion 36 and 38 are separated by a resilient pressure ring 48 and inwardly of the ring there is a pressure cup element 49 having a flange 50 by which it is retained in position. The cup is resilient and snugly holds the head 24 against looseness in the space 28. In FIG. 6 the unit 47 has a modified lower housing portion 38A in which there is a cylindrical projection 38B having internal threads to receive an adjustable plug-collar 51. The collar 51 has an external tool engaging flange 52, an aperture 53 to receive the shank 26 and a semi-spherical inner surface 54 that snugly engages the stud head 24.

Figure 13:
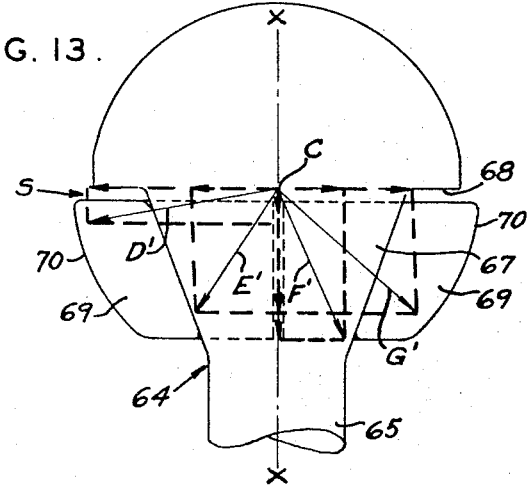
FIG. 13 is a view similar to FIG. 12, but of a tension loaded ball joint unit, as in FIG. 7.

With the foregoing principles and objects in mind, attention will now be directed to prime load carrying ball joint units of the tension loaded type as shown in FIGS. 7 to 11, and as seen schematically in FIG. 13.

Figure 7:
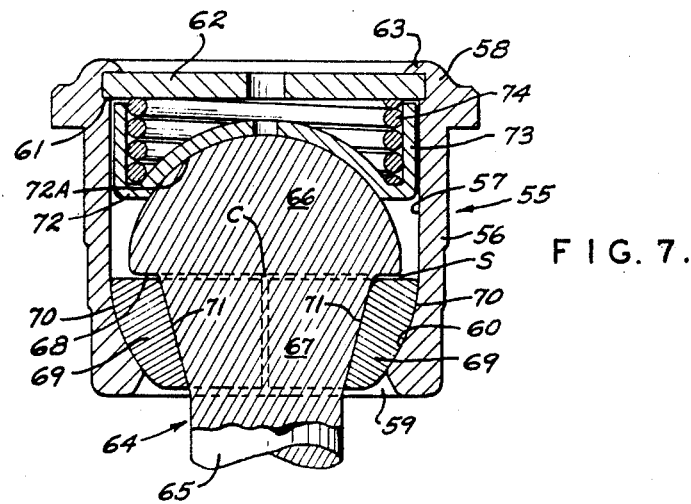
FIGS. 7 and 8 are vertical sectional elevational views of various forms of tension loaded ball joint units with a pre-load element and embodying the principles of this invention.

In FIG. 7 the ball joint unit 55 includes a housing 56 having a cylindrical bore 57 with a flanged upper end 58 and an aperture 59 in the opposite end adjacent an inner segmental part of a spherical bearing surface 60, with its great diameter matching the diameter of bore 57. The inner bearing surface thus converges toward aperture 59. The other end 58 has an inner shoulder 61 to receive a closure plate 62 that is secured in position by the upset lip 63. A stud 64 with its shank 65 projecting from the aperture 59 has its enlarged partially-spherical head 66 within the housing 56. The head 66 is connected to the shank 65 by a conically shaped portion 67 spaced from the inner spherical surface 60 of the housing 56 and both these surfaces converge in the same direction. The stud is symmetrical about it longitudinal axis and has a center of rotation C. The head 66 is formed with a flat clutch face 68 which defines a horizontal plane through the center of rotation. A plurality of segmental bearing elements (preferably 3) 69 are mounted between the conic portion 67 on the stud 64 and the bearing surface 60 in the housing 56. Each element 69 has an outer spherical bearing surface 70 substantially complementary with surface 60 and an inner tapered surface 71 substantially complementary with the conical portion 67 of the stud 64.

In the initial assembly of the unit 55 in FIG. 7 the components are sized so that there is a clearance space S between the clutch face 68 on the stud head 66 and the end faces on the large diameter ends of the elements 69. The space between the stud head 66 and closure plate 62 is occupied by a pressure cup 72 having a semi-spherical recess 72A to receive the stud head 66 and a cylindrical guide skirt 73 sliding in the bore 57. A spring member 74 presses the cup 72 down on the stud head 66, using the closure plate 62 as its reaction abutment.

The principle of operation of the ball joint unit 55 is similar to the unit 15 in FIG. 1, except that it is tension loaded. With reference to FIG. 13 it may be seen schematically that the vertical longitudinal axis X—X of the stud 64 passes through the center C and the stud is symmetrical about this axis X—X. The force vectors D′, E′, F′ and G′ represent the directions of the resultant force on the ball joint at certain times in its operation under dynamic loading. The conical portion 67 wedges the elements 69 radially outwardly and receives the reaction therefrom through the center C due to the symmetry of the parts about axis X—X, the force vectors D′, E′, F′ and G′ are shown to be made up of components along the axis X—X and components along the plane of the clutch face 68. Thus the resultant of these forces always acts below the contact surface between parts 66 and 70 for a tension loaded ball joint. Since a zone of contact between the bearing surfaces 70 of the elements 69 and the housing bearing surface 60 at or slightly below (say 3 to 5 degrees) the horizontal plane of the clutch face is established, vertical movement within the assembly is effectively prevented so that no impact occurs between the critical bearing surfaces.

As before pointed out in FIG. 3, the means 73 and 74 in FIG. 7 snugs the stud head 66 when the unit is unloaded thereby avoiding the impression of looseness in the assembly.

Figure 8:
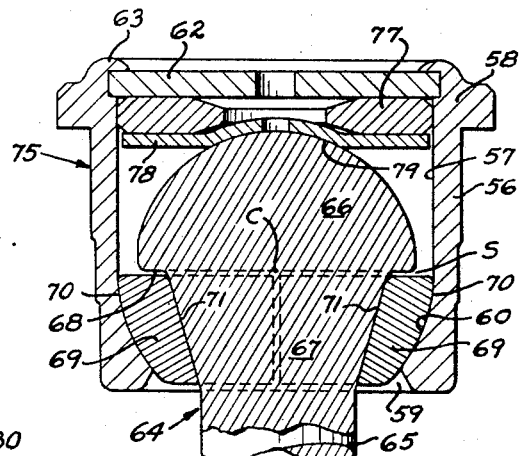
Figure 9:
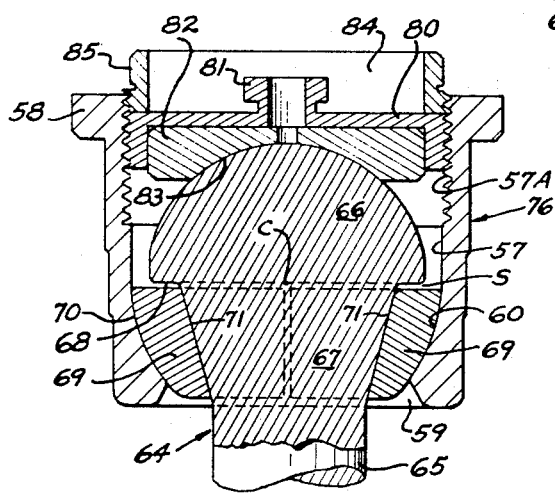
FIGS. 9 and 10 are vertical sectional elevational views of a further modification of tension loaded ball joint units.

In FIGS. 8 and 9 the ball joint units 75 and 76 respectively are similar to the unit 55 and like reference numerals will be applied wherever possible. In FIG. 8 the means to snug the stud head 66 when unloaded includes a resilient pad 77 abutting the cover plate 62, and a pressure plate 78 between the pad 77 and the stud head 66. The plate 78 has a spherical recess 79 to receive the stud head 66. In FIG. 9 the ball joint unit 76 is modified to incorporate manually adjustable snugging means (like that in FIG. 6) which includes threading a portion 57A of the outer end of the housing bore 57 to receive a threaded adjustment cup 80 having the tool engaging projection 81 thereon. The cup 80 receives a wear pad 82 formed with a spherical recess 83 to abut the stud head 66. A locking collar 84 is threaded against the cup 80 to secure it in adjusted position. The collar has a tool surface 85 thereon.

Figure 10:
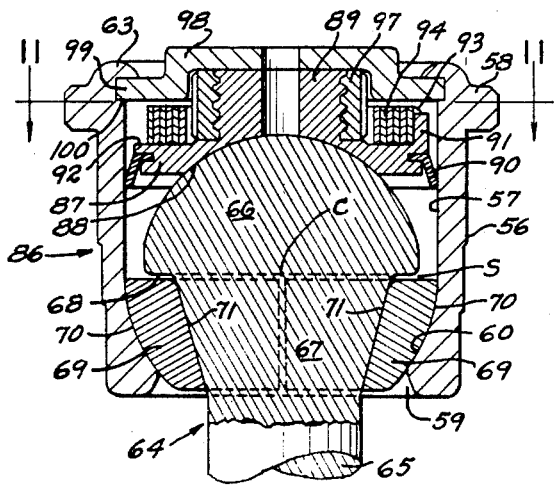
Figure 11:
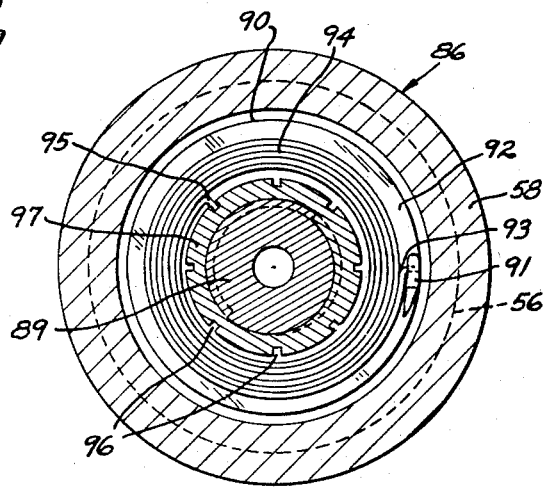
FIG. 11 is a sectional plan view of the ball joint of FIG. 10 seen at line 11—11.

A further modification of a tension loaded ball joint unit 86 is shown in FIGS. 10 and 11. The unit 86 is similar to that shown in FIG. 7 and like reference numerals will be used wherever possible. The modification herein is directed to means for automatically snugging the stud head 66 against axial movement away from the housing bearing surface 60. This means includes a thrust member 87 centrally recessed at 88 to bear upon the stud head 66, and formed with a central axial stem 89 having external threads thereon. The member 87 carries a peripheral seal 90 engaging the bore 57 of housing 56 to exclude lubricant from the space above the seal 90. The member has an anchor projection 91 on its upper surface 92 to receive and secure one end 93 of a flat spiral spring 94 carried by surface 92. The inner hooked end 95 of the spring 94 is selectively anchored in one of a plurality of vertical notches 96 (FIG. 11) formed in the periphery of an adjusting nut member 97 which is threaded internally to engage the threads on the stem 89. The automatic snugging means is secured in position by a closure cap 98 having its flanges 99 resting on housing shoulder 100 and held by the up set lip 63.

In operation, the snugging means of FIG. 10 automatically operates through the spring 94 to effect relative threading action of member 87 and nut 97 to axially expand these parts between the closure 98 and the stud head 66 as wear takes place. The threads on the parts 89 and 97 are self locking so that no reverse rotation can occur.

In the several forms of the invention above described it should be understood that the tolerances of the stud cone projection and the tolerances of the cone-shaped inner surfaces of the bearing elements is chosen such that the zone of first contact is always adjacent the horizontal plane through the center of rotation. Similarly the tolerances of the outer spherically shaped surfaces of the bearing elements and the tolerances of the inner bearing surface for the housing is chosen such that the zone of first contact is always adjacent the plane of the great diameter. This then controls the bearing elements so that the stud is held in centered position during both oscillation about the center C and rotation about its longitudinal axis. Since the stud head and bearing elements are thus caused to co-operate at all times there is no possibility for the stud to shift its axis laterally away from the alignment of its longitudinal axis through the center C and climbing is effectively prevented as there is no vertical movement because there is no radial clearance permitted when the bearing elements are in contact with the housing at or substantially in a zone of the great diameter which is also approximately on or close to the horizontal plane of the center of rotation of the unit.

The present invention has been disclosed in certain presently preferred embodiments of compression and tension loaded prime load carrying ball joint units. It is understood that modification may come to mind after considering this disclosure and that it is the aim to include the same within the spirit and scope of the appended claims.

What is claimed is:

1. A ball joint unit comprising: a housing having an interior load supporting bearing surface of semi-spherical form converging toward one end of said housing; and a unitary axially elongated stud operably carried by said housing and having an enlarged headed end in said housing axially spaced from said interior bearing surface and a shank projecting therefrom, said headed end including a truncated cone shaped portion convergently directed toward said housing interior bearing surface and extending along the axis of said stud and an annularly extending great diameter face surface adjacent one end of said truncated cone portion and facing toward said interior bearing surface, and a plurality of bearing elements each having a first outer peripheral bearing surface which is a segment of a sphere and a second inner peripheral bearing surface which is a concave segment of a cone, said first bearing surfaces of said plurality of elements together constituting a semi-spherical surface engaged upon said interior load supporting bearing surface of said housing, said second bearing surfaces of the plurality of elements together constituting a conical socket seated on said truncated cone shaped portion on said studs headed end, and said bearing elements being normally spaced from said annular great diameter face on said stud headed end.

2. A ball joint unit as defined in claim 1, and in which said bearing elements having the first bearing surfaces substantially complementary to said housing interior bearing surface at least at a zone adjacent the great diameter thereof and having the second bearing surfaces substantially complementary to said truncated cone portion at least at a zone adjacent the great diameter face plane, said conical truncated cone portion acting on said second surfaces to at least initially wedge the bearing elements into bearing engagement with said housing interior bearing surface adjacent the great diameter thereof.

3. A ball joint unit comprising a housing having an interior bearing surface adjacent one end thereof, a load transmitting axially elongated stud having an enlarged head in said housing, said stud head having a clutch face thereon and a conical portion thereon extending to one side of said clutch face, a plurality of bearing elements operably mounted on said conical portion of said stud head and having outer bearing surfaces engaged with said interior bearing surface of said housing, said bearing elements having common ends spaced from said clutch face, the surface of said stud head opposite said conical portion being spaced from the housing, and a ring element having an annular portion and a plurality of resilient fingers carried by said housing and disposed in the last mentioned space to engage said stud head surface and resist displacement of said stud head in a direction to unseat said bearing elements from said interior bearing surface said fingers projecting radially inwardly from said annular portion.

4. In a self-centering ball joint for use as a prime load carrying member of steerable vehicle wheels, in combination, a housing having an interior spherically shaped bearing surface formed with a great diameter circular bearing surface spaced inwardly from said one housing end, a unitary axially elongated load transmitting stud extending into said housing and having an enlarged head in said housing, said stud head having a shoulder providing an annular clutch face facing said interior bearing surface and a truncated conical portion extending from one side of said annular clutch face converging toward the interior bearing surface, said annular clutch face being positioned adjacent said greater diameter of said circular bearing surface, and a plurality of bearing elements seated on said truncated conical portion of said stud head, said bearing elements being substantially similar and having on their inner peripheries conical surfaces substantially mating with said truncated conical portion close to said clutch face and outer segmental spherical surfaces substantially mating with and engaging said spherically shaped bearing surface close to said great diameter, said stud head being operably supported in said housing upon said bearing elements and said bearing elements having end portions spaced from said annular clutch face to initially centrally support said stud head for rotation of said conical portion relative to said bearing elements, progressive wear-in of said conical portion taking up said space at said annular clutch face, whereby said bearing elements and stud head may rotate together on said spherically shaped bearing surface.

5. In a self-centering ball joint unit for the prime load support of steerable vehicle wheels comprising in combination, a unitary axially elongated load transmitting stud having an enlarged headed end formed with a shoulder providing an annular clutch face and an outwardly converging truncated conical portion extending axially from and to one side of said clutch face, a plurality of bearing elements seated on said conical portion of said stud head and on their inner peripheries conical surfaces substantially mating with said truncated conical portion, said annular clutch face being disposed at the major diameter of said stud head and defining a plane normal to the axis of said stud, said plurality of bearing elements having outer surfaces that define a spherically shaped bearing surface having a major diameter end portion spaced from said plane of the clutch face and progressively decreasing in diameter outwardly from said plane, a housing loosely enclosing said stud head and substantially spherical bearing elements and having a bearing surface therein adjacent one end and substantially mating with and engaging said spherically shaped bearing surface of said bearing elements, said housing bearing surface having a major diameter substantially coincident with the major diameter of said spherically shaped surface of said bearing elements, the center point of said housing bearing surface being on the axis of said stud and substantially in the plane of said clutch face, said bearing elements maintaining said stud axis coincident with said center point and permitting stud rotation initially within said bearing elements while said major diameter thereof is spaced from said clutch face and thereafter said clutch face engaging said bearing elements at said major diameter and causing subsequent rotation of said stud and bearing elements together relative to said housing bearing surfaces.

6. The self-centering ball joint unit set forth in claim 5 and including looseness resistant means in said housing bearing upon said stud head opposite to said conical portion, said bearing means taking up looseness between said stud head and housing and forcing said conical portion to wedge said bearing elements against said housing bearing surface, said looseness resisting means comprises a ring element having an annular portion and a plurality of resilient fingers engaged by said stud head, said fingers projecting radially inwardly from said annular portion.

References Cited

UNITED STATES PATENTS

| | | | |
|---|---|---|---|
| 2,110,148 | 3/1938 | Gross | 287—90 |
| 2,631,044 | 3/1953 | Booth | 287—90 X |
| 2,924,469 | 2/1960 | Moskovitz | 287—90 |
| 2,954,993 | 10/1960 | Scheublein et al. | 287—90 |
| 3,019,041 | 11/1962 | Scheublein et al. | 287—87 |
| 3,180,655 | 4/1965 | Gerner | 287—93 X |
| 3,245,706 | 4/1966 | Rowlett | 287—90 |
| 3,250,555 | 5/1966 | Wehner | 287—90 |

FOREIGN PATENTS 680,987 9/1939 Germany.

CARL W. TOMLIN, *Primary Examiner.*

ANDREW KUNDRAT, *Assistant Examiner.*

UNITED STATES PATENT OFFICE
CERTIFICATE OF CORRECTION

Patent No. 3,429,598                                            February 25, 1969

William A. Scheublein, Jr., et al.

It is certified that error appears in the above identified patent and that said Letters Patent are hereby corrected as shown below:

Column 5, line 33, "39" should read -- 29 --. Column 8, line 75, after "head" and before "and" insert -- and bearing elements -- same line 75, after "and" and before "substantially" insert -- having a --. Column 9, line 1, after "ing" at the beginning of the line, cancel "elements and having a bearing".

Signed and sealed this 19th day of May 1970.

(SEAL)
Attest:

Edward M. Fletcher, Jr.                                    WILLIAM E. SCHUYLER, JR.
Attesting Officer                                                Commissioner of Patents